US008799925B2

(12) United States Patent
Gamaley et al.

(10) Patent No.: US 8,799,925 B2
(45) Date of Patent: Aug. 5, 2014

(54) MANAGING CONTACT LIST STATUS NOTIFICATIONS IN COLLABORATION SYSTEMS TO REDUCE NETWORK TRAFFIC

(75) Inventors: Vladimir Gamaley, Rehovot (IL); Frieda-Gila Revel, Rehovot (IL); Galina Rubinshtein, Holon (IL)

(73) Assignee: International Business Machines Corporation, Armonk, NY (US)

( * ) Notice: Subject to any disclaimer, the term of this patent is extended or adjusted under 35 U.S.C. 154(b) by 1339 days.

(21) Appl. No.: 11/966,096

(22) Filed: Dec. 28, 2007

(65) Prior Publication Data
US 2009/0172701 A1    Jul. 2, 2009

(51) Int. Cl.
G06F 3/00      (2006.01)
G06F 9/44      (2006.01)
G06F 9/46      (2006.01)
G06F 13/00     (2006.01)

(52) U.S. Cl.
USPC ........................................ 719/318

(58) Field of Classification Search
USPC .......................................... 719/318
See application file for complete search history.

(56) References Cited

U.S. PATENT DOCUMENTS

| 6,750,881 | B1 | 6/2004 | Appelman |
| 2003/0065721 | A1* | 4/2003 | Roskind ........................ 709/204 |
| 2004/0199582 | A1 | 10/2004 | Kucharewski et al. |
| 2006/0167991 | A1 | 7/2006 | Heikes et al. |
| 2006/0227803 | A1* | 10/2006 | Malik ........................... 370/461 |
| 2008/0084977 | A1* | 4/2008 | Nayak et al. .................. 379/130 |
| 2008/0201419 | A1* | 8/2008 | Hung et al. .................... 709/204 |
| 2010/0077038 | A1* | 3/2010 | Boberg et al. ................. 709/206 |

* cited by examiner

Primary Examiner — Andy Ho
Assistant Examiner — Timothy A Mudrick
(74) Attorney, Agent, or Firm — Sughrue Mion, PLLC

(57) ABSTRACT

An awareness notification management system including a contact list manager managing an awareness service subscriber contact list including an active sublist for active contacts and an archive sublist for disabled contacts, and an awareness manager for monitoring the status contact list members, where the awareness manager is configured to access a history including at least one timestamp of a last communication exchange between the awareness service subscriber and any of the members of the contact list, and query the history for any of the timestamps and classify any of the contacts as a disabled contact on the archive sublist if the timestamp for the contact is older than a predefined age, and where the awareness manager is configured to forward to the awareness service subscriber awareness notifications regarding the status of the active contacts and withhold from the awareness service subscriber awareness notifications regarding the status of the disabled contacts.

27 Claims, 11 Drawing Sheets

MANAGING CONTACT LIST STATUS NOTIFICATIONS IN COLLABORATION SYSTEMS TO REDUCE NETWORK TRAFFIC

FIELD OF THE INVENTION

The present invention relates to collaboration systems in general, and more particularly to managing contact list status notifications.

BACKGROUND OF THE INVENTION

Collaboration software is an increasingly popular tool that enables computer users to interact in real-time using their computers. Some common features of collaboration software include the ability for users to maintain contact lists of other users with whom they collaborate, as well as a mechanism for managing the "awareness" of contact list owners by informing contact list owners of changes in the status of their contact list members, such as their availability, accessible devices, mood, activities, and other personal attributes. Contact status information is typically provided to collaboration software users in the form of notifications sent by an awareness server that keeps track of the status of contact list members. When a status change occurs for a contact list member, a notification of the change in status is sent to the owner of the contact list.

In typical collaboration software configurations, notifications of status changes are sent regarding all members of a client's contact list. As a contact list grows, more and more status notifications are sent, causing an increased load on the awareness server. One way to reduce this load is to limit the size of a user's contact list, such as by having the user delete members from, or refrain from adding new members to the contact list. However, this may cause important contact information to be lost, and may restrict future collaboration opportunities, thus reducing the utility of collaboration software.

SUMMARY OF THE INVENTION

In one aspect of the present invention an awareness notification management system is provided including a contact list manager configured to manage a contact list of an awareness service subscriber, the contact list including an active sublist having at least one active contact and an archive sublist having at least one disabled contact, and an awareness manager configured to monitor a status of any member of the contact list, where the awareness manager is configured to access a history including at least one timestamp of a last communication exchange between the awareness service subscriber and any of the members of the contact list, and query the history for any of the timestamps and classify any of the contacts as a disabled contact on the archive sublist if the timestamp for the contact is older than a predefined age, and where the awareness manager is configured to forward to the awareness service subscriber awareness notifications regarding the status of the active contacts and withhold from the awareness service subscriber awareness notifications regarding the status of the disabled contacts.

In another aspect of the present invention the contact manager is configured to notify the awareness service subscriber which of the contacts are disabled contacts.

In another aspect of the present invention the awareness manager is configured to maintain the history.

In another aspect of the present invention the awareness manager is configured to classify any of the contacts as an active contact on the active sublist if the timestamp for the contact is younger than a predefined age.

In another aspect of the present invention the awareness manager is configured to receive a request from the awareness service subscriber to reclassify any of the disabled contacts as an active contact on the active sublist.

In another aspect of the present invention the awareness manager is configured to receive a request from the awareness service subscriber to reclassify any of the active contacts as a disabled contact on the archive sublist.

In another aspect of the present invention the awareness manager is configured to request a confirmation from the awareness service subscriber prior to classifying any of the active contacts as a disabled contact on the archive sublist, and classify the active contacts as a disabled contact responsive to receiving a positive response to the confirmation.

In another aspect of the present invention the awareness manager is configured to detect new collaborations between the awareness service subscriber and any of the members of the contact list and update any of the history, the active sublist, and the archive sublist responsive to the detection.

In another aspect of the present invention an awareness notification management method is provided including managing a contact list of an awareness service subscriber, the contact list including an active sublist having at least one active contact and an archive sublist having at least one disabled contact, monitoring a status of any member of the contact list, querying a history for at least one timestamp of a last communication exchange between the awareness service subscriber and any of the members of the contact list, classifying any of the contacts as a disabled contact on the archive sublist if the timestamp for the contact is older than a predefined age, and forwarding to the awareness service subscriber awareness notifications regarding the status of the active contacts and withhold from the awareness service subscriber awareness notifications regarding the status of the disabled contacts.

In another aspect of the present invention the method further includes notifying the awareness service subscriber which of the contacts are disabled contacts.

In another aspect of the present invention the method further includes maintaining the history.

In another aspect of the present invention the method further includes classifying any of the contacts as an active contact on the active sublist if the timestamp for the contact is younger than a predefined age.

In another aspect of the present invention the method further includes receiving a request from the awareness service subscriber to reclassify any of the disabled contacts as an active contact on the active sublist.

In another aspect of the present invention the method further includes receiving a request from the awareness service subscriber to reclassify any of the active contacts as a disabled contact on the archive sublist.

In another aspect of the present invention the method further includes requesting a confirmation from the awareness service subscriber prior to classifying any of the active contacts as a disabled contact on the archive sublist, and classifying the active contacts as a disabled contact responsive to receiving a positive response to the confirmation.

In another aspect of the present invention the method further includes detecting new collaborations between the awareness service subscriber and any of the members of the contact list and update any of the history, the active sublist, and the archive sublist responsive to the detection.

In another aspect of the present invention a including receiving an active sublist having at least one active contact and an archive sublist having at least one disabled contact, displaying the sublists where the members each of said sublists are visually differentiated, receiving at least one notification regarding the status of any of the active contacts, and displaying an indication of the status for said active contact in the displayed active sublist.

In another aspect of the present invention a computer program is provided embodied on a computer-readable medium, the computer program including a first code segment operative to manage a contact list of an awareness service subscriber, the contact list including an active sublist having at least one active contact and an archive sublist having at least one disabled contact, a second code segment operative to monitor a status of any member of the contact list, a third code segment operative to query a history for at least one timestamp of a last communication exchange between the awareness service subscriber and any of the members of the contact list, a fourth code segment operative to classify any of the contacts as a disabled contact on the archive sublist if the timestamp for the contact is older than a predefined age, and a fifth code segment operative to forward to the awareness service subscriber awareness notifications regarding the status of the active contacts and withhold from the awareness service subscriber awareness notifications regarding the status of the disabled contacts.

In another aspect of the present invention the computer program has a sixth code segment operative to notify the awareness service subscriber which of the contacts are disabled contacts.

In another aspect of the present invention the computer program has a sixth code segment operative to maintain the history.

In another aspect of the present invention the computer program has a sixth code segment operative to classify any of the contacts as an active contact on the active sublist if the timestamp for the contact is younger than a predefined age.

In another aspect of the present invention the computer program has a sixth code segment operative to receive a request from the awareness service subscriber to reclassify any of the disabled contacts as an active contact on the active sublist.

In another aspect of the present invention the computer program has a sixth code segment operative to receive a request from the awareness service subscriber to reclassify any of the active contacts as a disabled contact on the archive sublist.

In another aspect of the present invention the computer program has a sixth code segment operative to request a confirmation from the awareness service subscriber prior to classifying any of the active contacts as a disabled contact on the archive sublist, and classify the active contacts as a disabled contact responsive to receiving a positive response to the confirmation.

In another aspect of the present invention the computer program has a sixth code segment operative to detect new collaborations between the awareness service subscriber and any of the members of the contact list and update any of the history, the active sublist, and the archive sublist responsive to the detection.

BRIEF DESCRIPTION OF THE DRAWINGS

The present invention will be understood and appreciated more fully from the following detailed description taken in conjunction with the appended drawings in which.

DETAILED DESCRIPTION OF THE INVENTION

Figure 1A:
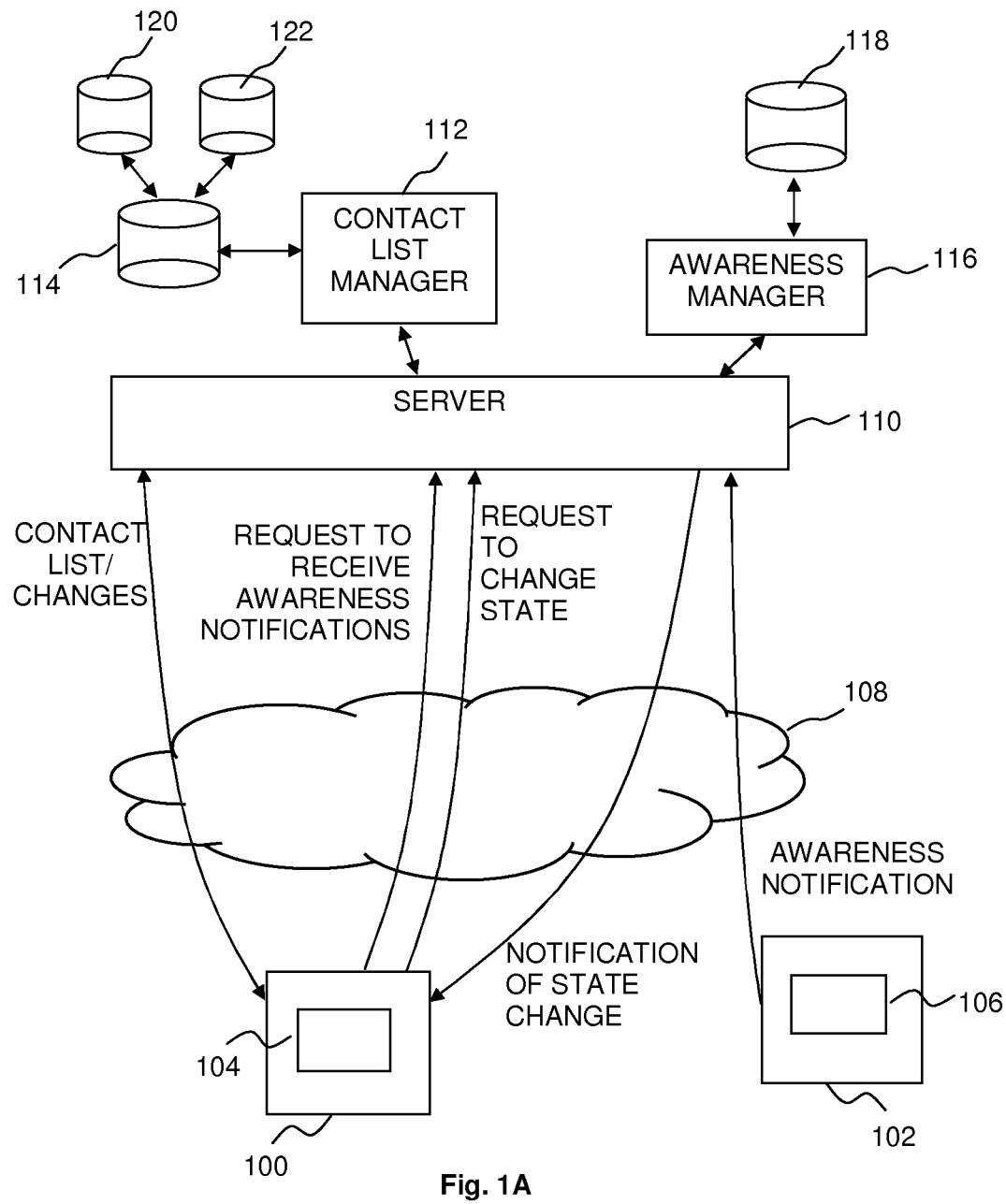
FIG. 1A is a simplified conceptual illustration of an awareness notification management system constructed and operative in accordance with an embodiment of the present invention.
Figure 2A:
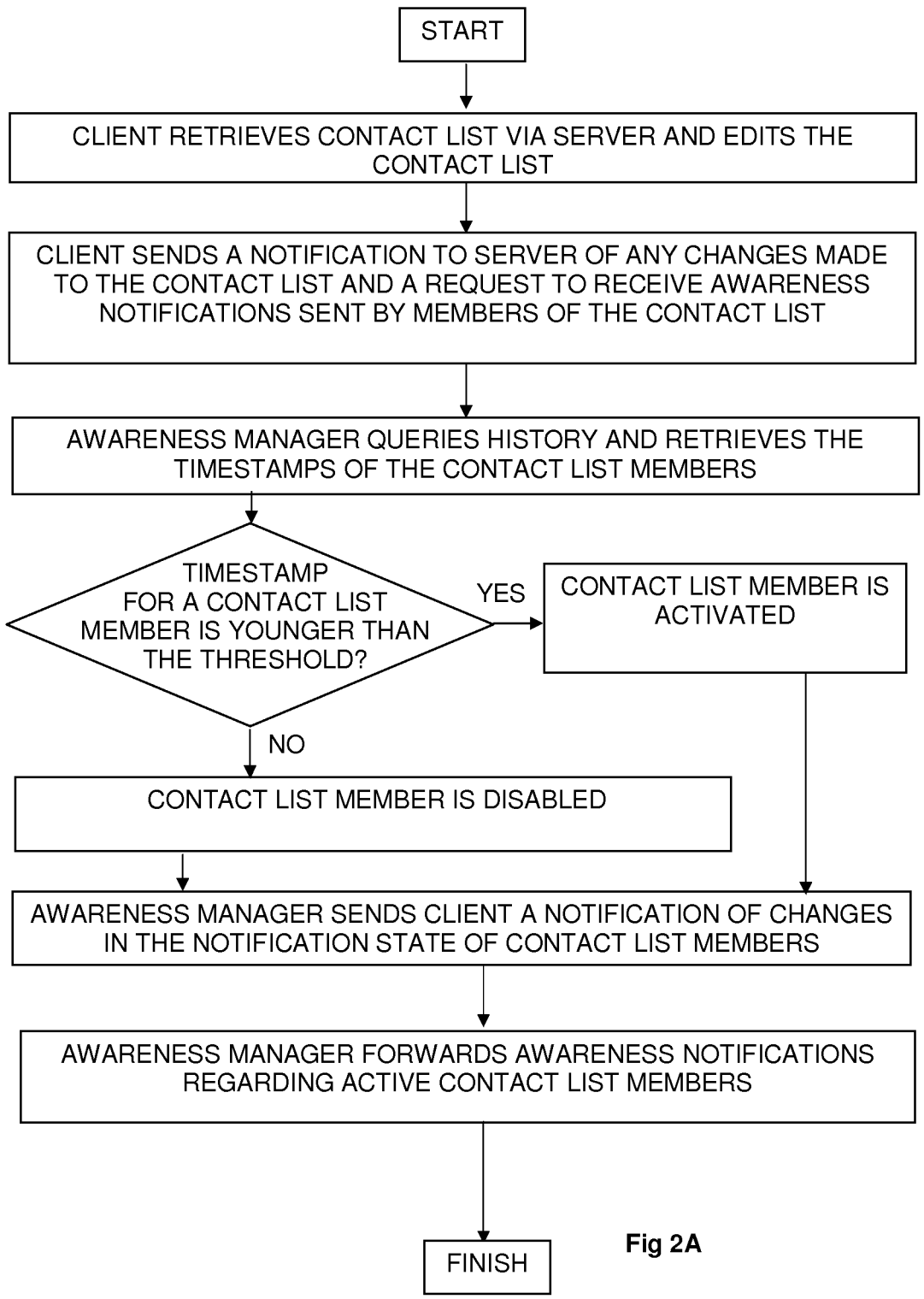
FIG. 2A is a simplified flowchart illustration of an exemplary method of operation of the system of FIG. 1A, operative in accordance with an embodiment of the present invention.

Reference is now made to FIG. 1A which is a simplified conceptual illustration of an awareness notification management system, constructed and operative in accordance with an embodiment of the present invention, and additionally to FIG. 2A, which is a simplified flowchart illustration of an exemplary method of operation of the system of FIG. 1A operative in accordance with an embodiment of the present invention.

The system of FIG. 1A may be appreciated in the context of the following exemplary operational scenario in which two computers, 100 and 102, are configured with data communications client programs 104 and 106 respectively, preferably being collaboration software such as Sametime™, commercially available from International Business Machines Corporation, Armonk, N.Y. Clients 104 and 106 are preferably configured to communicate with each other via a network 108, such as the Internet. A server 110 preferably includes a contact list manager 112 which manages a contact list 114, such as may be constructed by client 104. Server 110 also preferably includes an awareness manager 116, which preferably monitors the status of the members of contact list 114, and a history 118, in which awareness manager 116 preferably maintains a timestamp of the last communication exchange between client 104 and the members of contact list 114, to which information server 110 is privy. Contact list 114 is preferably organized into at least two sublists, such as an active sublist 120 for active contacts and an archive sublist 122 for disabled contacts, as will be explained in greater detail below.

Client 104 sends a request to contact list manager 112 via network 108 and server 110 to retrieve the contents of contact list 114. Contact list manager 112 sends the contents of contact list 114, which includes both active sublist 120 and archive sublist 122, to client 104 via server 110 and network 108 (step 200). Client 104 is preferably configured to display the sublists of contact list 114 in such a way that members of the different sublists may be easily differentiated, such as by displaying the members of the active sublist under an "ACTIVE" heading, and the members of the archive sublist under an "ARCHIVE" heading. Client 104 is preferably configured to allow the editing of contact list 114, such as by adding a new contact, and preferably sends a notification detailing any changes to contact list 114 to contact list manager 112 via server 110 and network 108. Client 104 preferably sends a request to awareness manager 116 via server 110 and network 108 to monitor the status of the members of contact list 114 and receive awareness notifications regarding changes in the statuses of the members of contact list 114 (step 202). Awareness manager 116 preferably defines the members of contact list 114 as being in one of multiple notification states, such as "active' for members of active sublist 120 and "disabled' for members of archive sublist 122. Awareness manager 116 preferably queries history 118 to determine the timestamps of the most recent collaborations between the members of contact list 114 and client 104 (step 204). For example, history 118 may be accessed using an application programming interface (API) such as long get-LastCollaboration (String user1, String user2) to return a timestamp of the most recent collaboration between any given pair of users. It is noted that collaboration between users may include any type of exchange of any type of information between a variety of clients, such as email, instant messaging (IM), video, or audio, to name a few, as may be known to server 110. Awareness manager 116 preferably uses the results obtained by querying history 118 to change the notification state of the members of contact list 114 according to predetermined criteria, such as by comparing the timestamp obtained from history 118 of the most recent collaboration of the members of contact list 114 and client 104 with a predefined age value, such as one month. For example, if the retrieved timestamp for the most recent collaboration between a contact and client 104 is older than the age value, then awareness manager 116 preferably sets the notification state of that contact to "disabled' and places the contact into archive sublist 122. Awareness manager 116 preferably sends client 104 a message via server 110 and network 108 notifying client 104 that the contact has been disabled (step 206). If the retrieved timestamp for the most recent collaboration between a contact and client 104 is younger than the age value, then awareness manager 116 preferably sets the notification state of that contact to "active' and places the contact into active sublist 120 (step 208). Awareness manager 116 preferably sends client 104 a message via server 110 and network 108 notifying client 104 that the contact is active. Awareness manager 116 preferably forwards only awareness notifications regarding the status of active contacts and therefore appear in active sublist 120 to client 104 (step 210). Thus, for example, were awareness manager 116 to detect a change in the status of client 106 whose notification state is currently disabled and who therefore appears in archive sublist 122, awareness manager would not send an awareness notification sent by client 106 to client 104.

At any point, client 104 sends a request to awareness manager 116 via network 108 and server 110 to disable an active contact, or activate a disabled contact. Upon receiving the request, awareness manager 116 changes the notification state of the contact accordingly and preferably sends a notification to client 104 confirming the change. If a disabled contact is activated, then awareness manager 116 preferably records the time of the change and updates the timestamp in history 118 to the new time. Additionally, client 104 may be enabled to configure the criterion determining the activating or disabling of contact list members and may send the criterion to awareness manager 116 via network 108 and server 110.

Figure 1B:
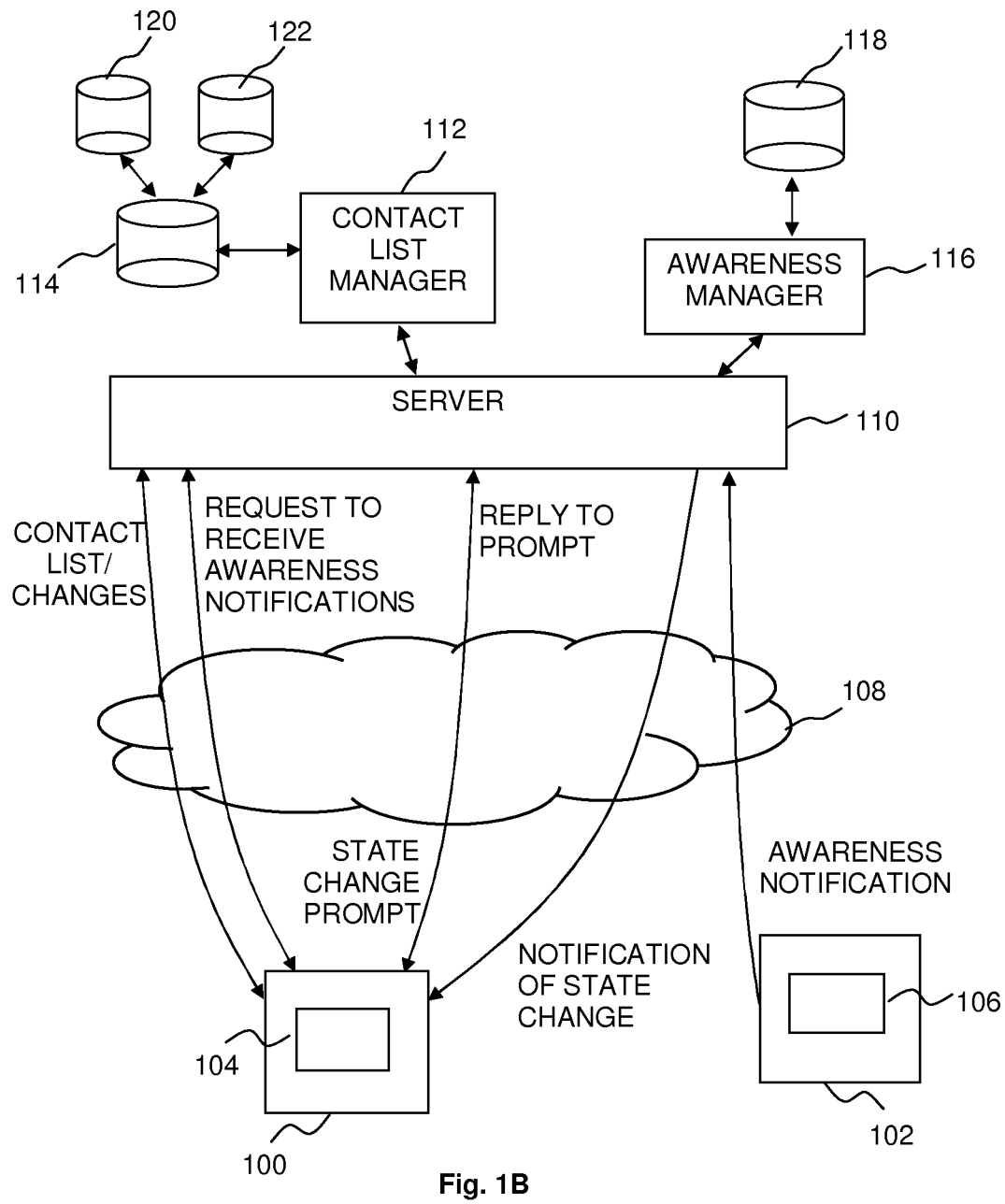
FIG. 1B is a simplified conceptual illustration of an awareness notification management system constructed and operative in accordance with another embodiment of the present invention.
Figure 2B:
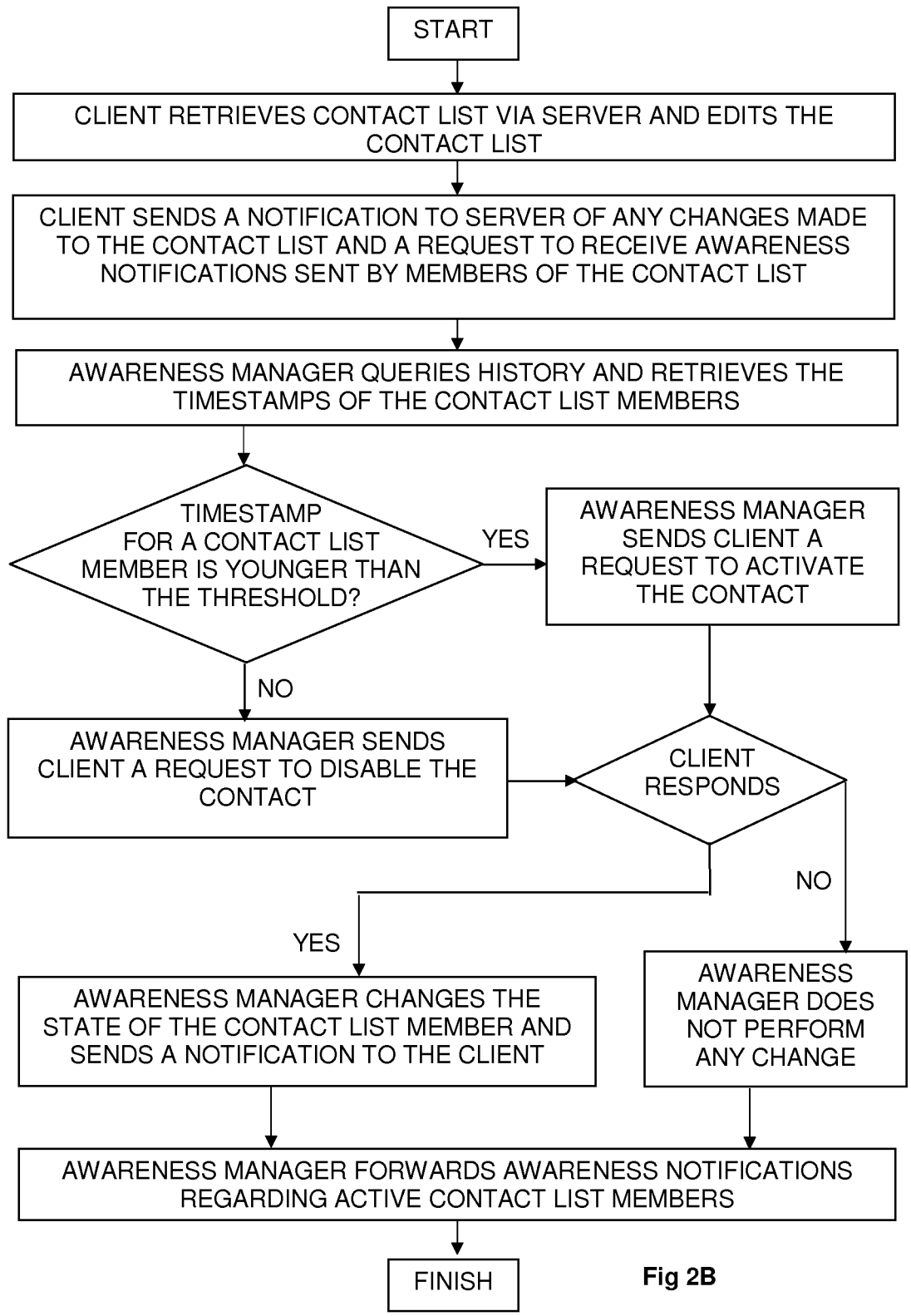
FIG. 2B is a simplified flowchart illustration of an exemplary method of operation of the system of FIG. 1B, operative in accordance with another embodiment of the present invention.

Reference is now made to FIG. 1B which is a simplified conceptual illustration of an awareness notification management system, constructed and operative in accordance with another embodiment of the present invention, and additionally to FIG. 2B, which is a simplified flowchart illustration of an exemplary method of operation of the system of FIG. 1B operative in accordance with another embodiment of the present invention. The system of FIG. 1B is substantially similar to the system of FIG. 1A described above with the notable exception that upon determining that a contact should be disabled, awareness manager 116 sends client 104 a prompt requesting a confirmation for the change of notification state (step 212). If awareness manager 116 receives an affirmative confirmation from client 104, then awareness manager 116 disables the contact and preferably sends client 104 a notification that the state of the contact has been set to "disabled' (step 206). If awareness manager 116 does not receive an affirmative confirmation from client 104 then awareness manager 116 does not disable the contact (step 214).

Figure 1C:
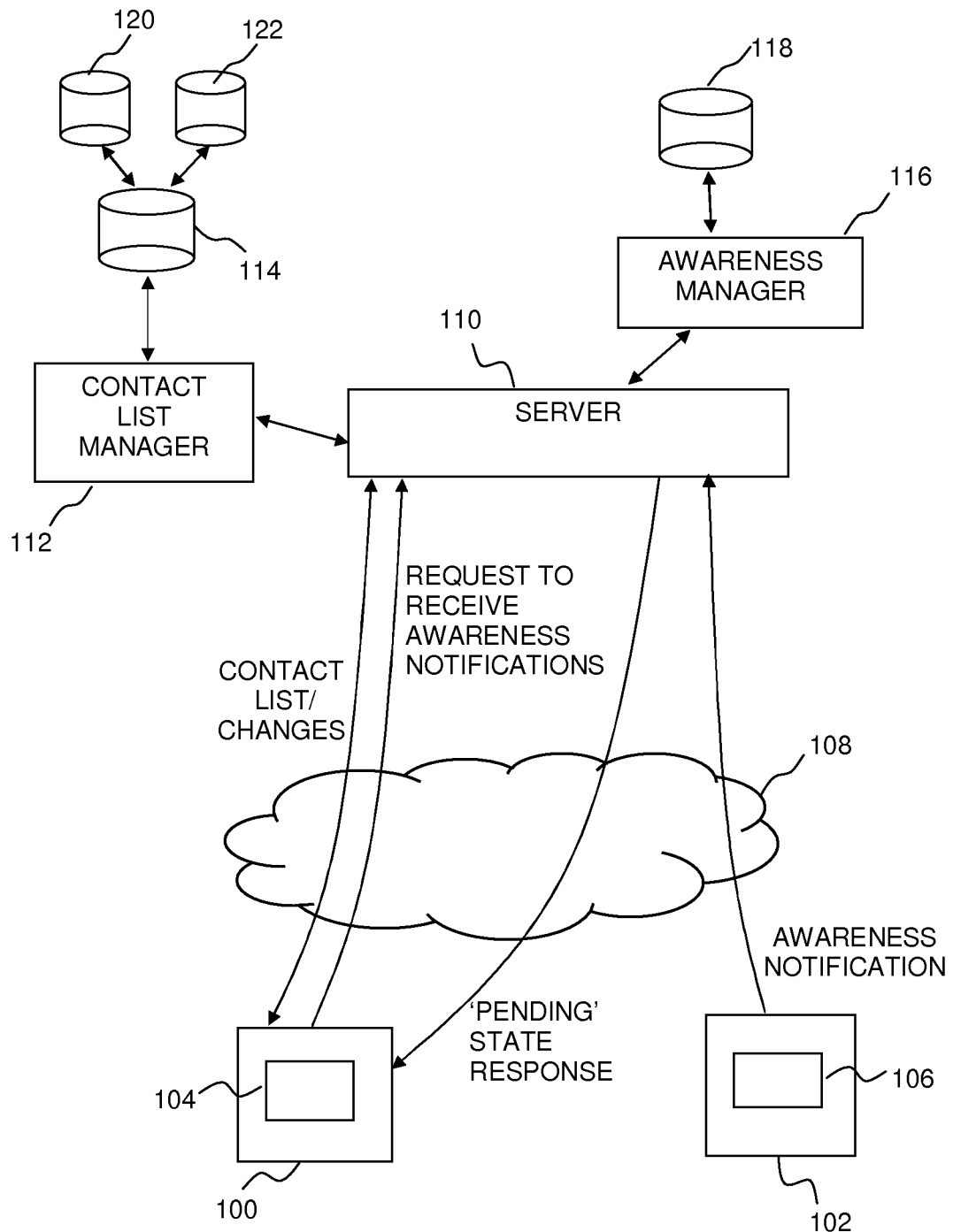
FIG. 1C is a simplified conceptual illustration of an awareness notification management system constructed and operative in accordance with another embodiment of the present invention.
Figure 2C:
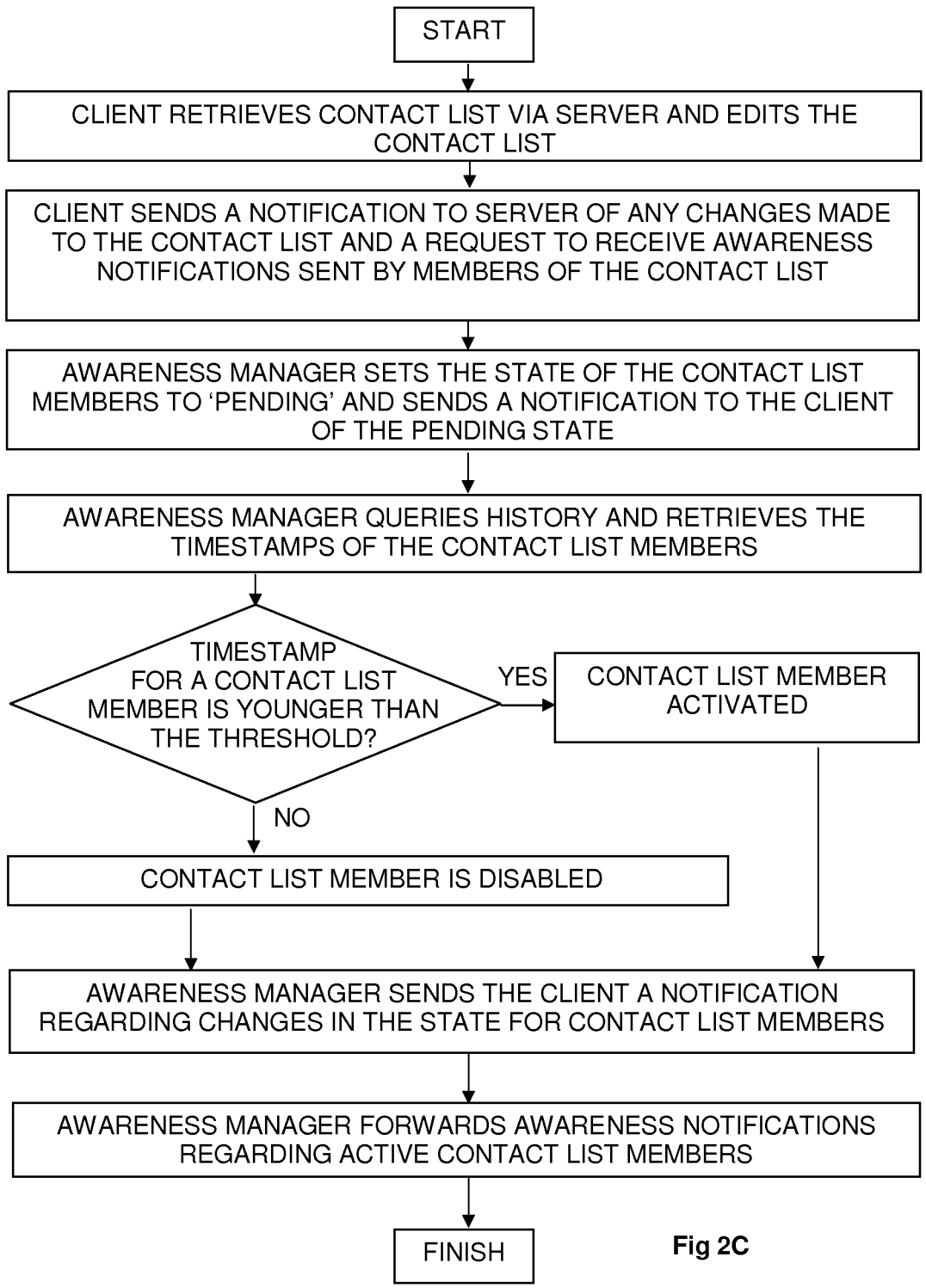
FIG. 2C is a simplified flowchart illustration of an exemplary method of operation of the system of FIG. 1C, operative in accordance with an embodiment of the present invention.

Reference is now made to FIG. 1C which is a simplified conceptual illustration of an awareness notification management system, constructed and operative in accordance with another embodiment of the present invention, and additionally to FIG. 2C, which is a simplified flowchart illustration of an exemplary method of operation of the system of FIG. 1C operative in accordance with an embodiment of the present invention. The system of FIG. 1C is substantially similar to the system of FIGS. 1A and 1B described above with the notable exception that upon sending a request to awareness manager 116 to monitor the status of the members of contact list 114 and forward awareness notifications regarding changes in the statuses of the members of contact list 114, the protocol implemented by client 104 preferably requires an immediate response from awareness manager 116, such as is required by the Session Initiated Protocol (SIP). Awareness manager 116 preferably defines an additional "pending' state for the members of contact list 114. Upon receiving a subscription from client 104 to monitor the status of, and forward awareness notifications sent by, the members of contact list 114, awareness manager 116 preferably sets the states of the members of contact list 114 to "pending' and sends a notification to client 104 via server 110 and network 108 of the current state (step 216). Having satisfied the protocol, awareness manager 116 preferably determines the appropriate notification states for the members of contact list 114 using any of the methods described above and notifies client 104 of any subsequent state changes.

Figure 1D:
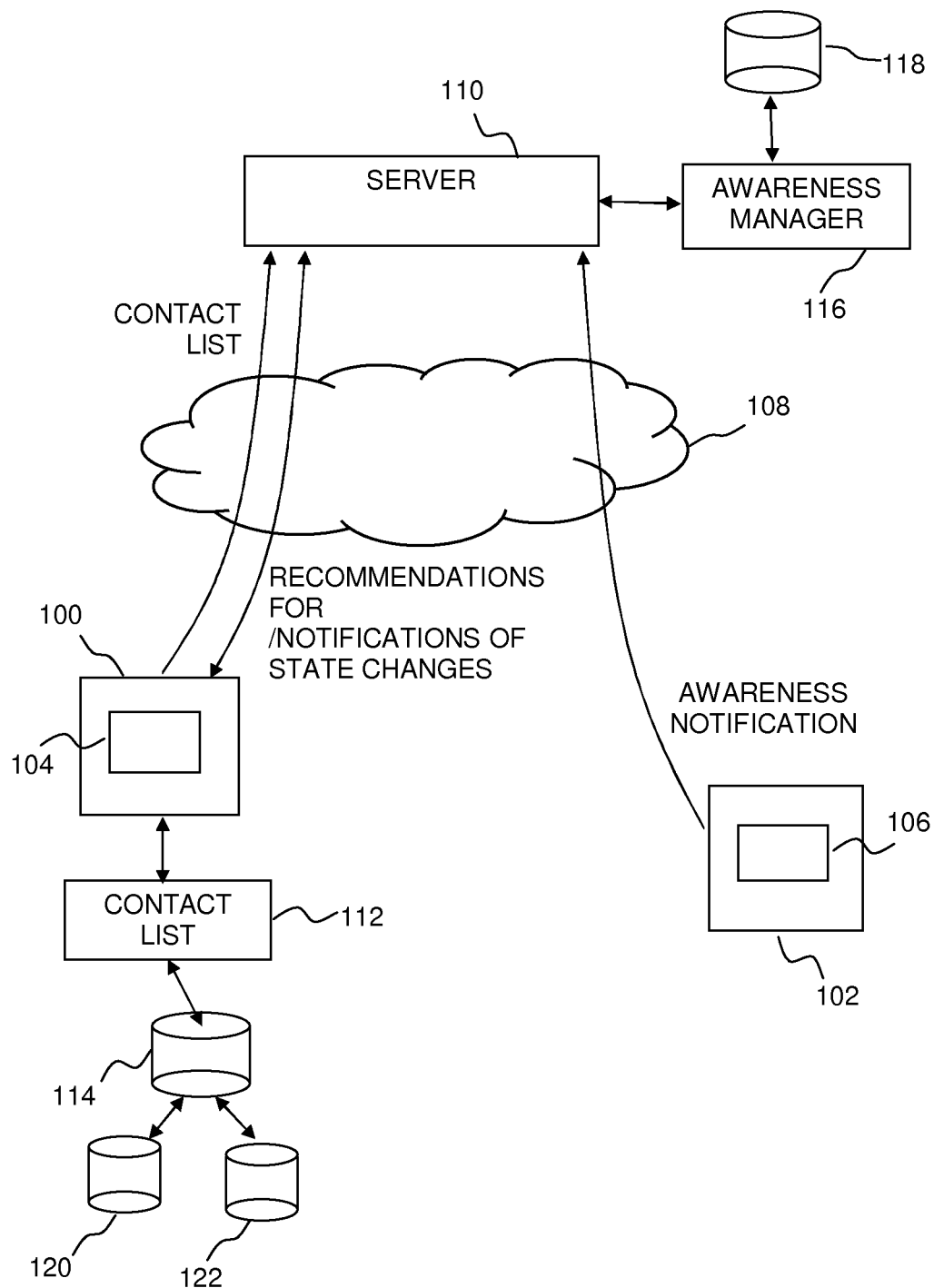
FIG. 1D is a simplified conceptual illustration of an awareness notification management system constructed and operative in accordance with another embodiment of the present invention.
Figure 2D:
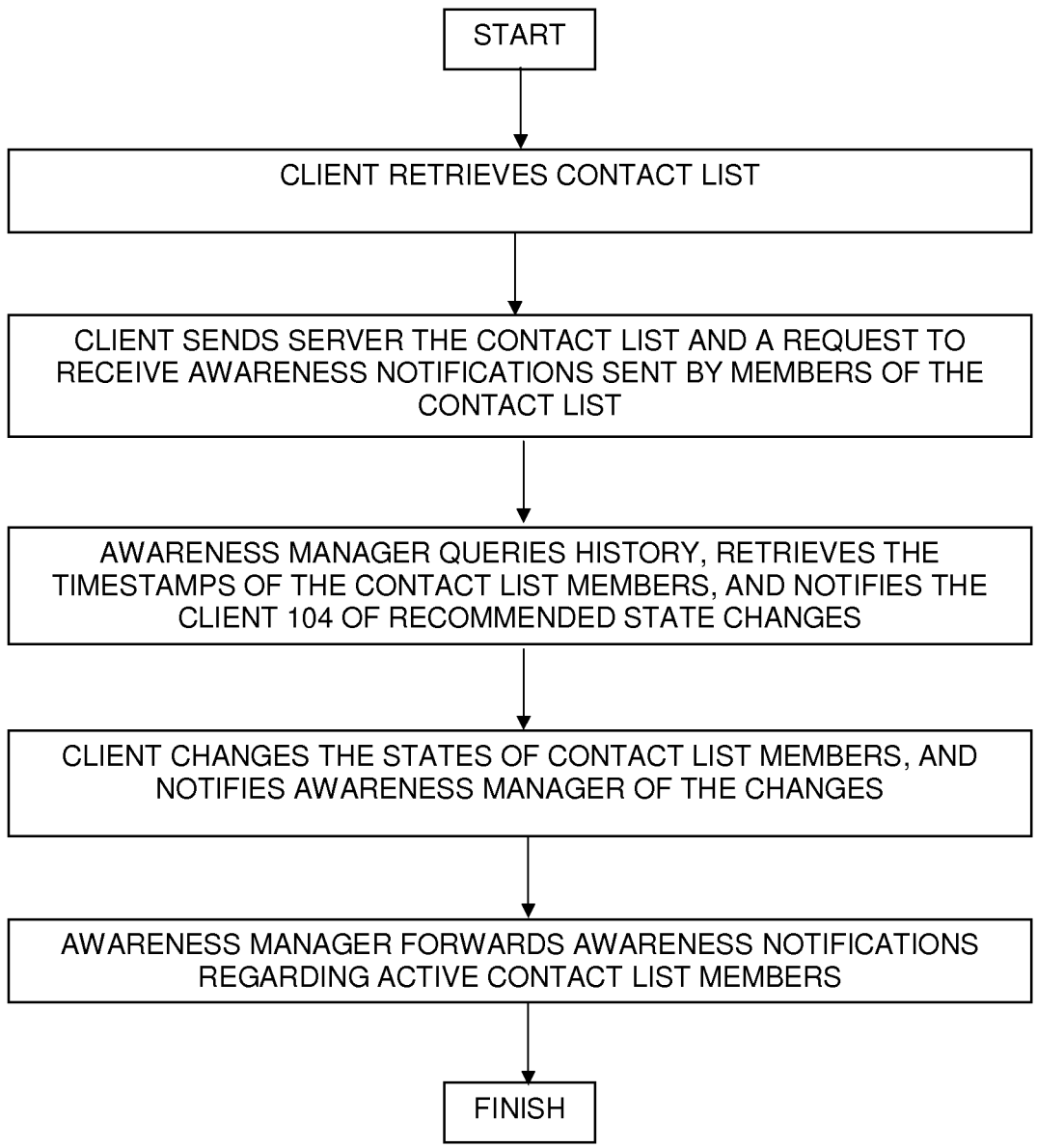
FIG. 2D is a simplified flowchart illustration of an exemplary method of operation of the system of FIG. 1D, operative in accordance with an embodiment of the present invention.

Reference is now made to FIG. 1D which is a simplified conceptual illustration of an awareness notification management system, constructed and operative in accordance with another embodiment of the present invention, and additionally to FIG. 2D, which is a simplified flowchart illustration of an exemplary method of operation of the system of FIG. 1D operative in accordance with an embodiment of the present invention. The system of FIG. 1D is substantially similar to the system of FIGS. 1A and 1B described above with the notable exception that in the system of FIG. 1D, contact list manager 112, contact list 114, active sublist 120 and archive sublist 122 are preferably included in computer 100. Client 104 retrieves contact list 114 from contact list manager 112 without communicating with awareness manager 116 (step 218). Client 104 sends the contents of contact list 114 or only the contents of active sublist 120 to awareness manager 116 with a request to monitor the status of and receive awareness notifications from the contacts that have been sent (step 220). Awareness manager 116 queries history 118 to determine the appropriate notification state for the sent contacts using the methods described above and sends client 104 a notification of recommended state changes (step 222). Client 104 is preferably enabled to activate or disable contacts using conventional means, such as by dragging and dropping contacts between active sublist 120 and archive sublist 122, and sends awareness manager 116 a notification regarding any change in a notification state (step 224).

Figure 1E:
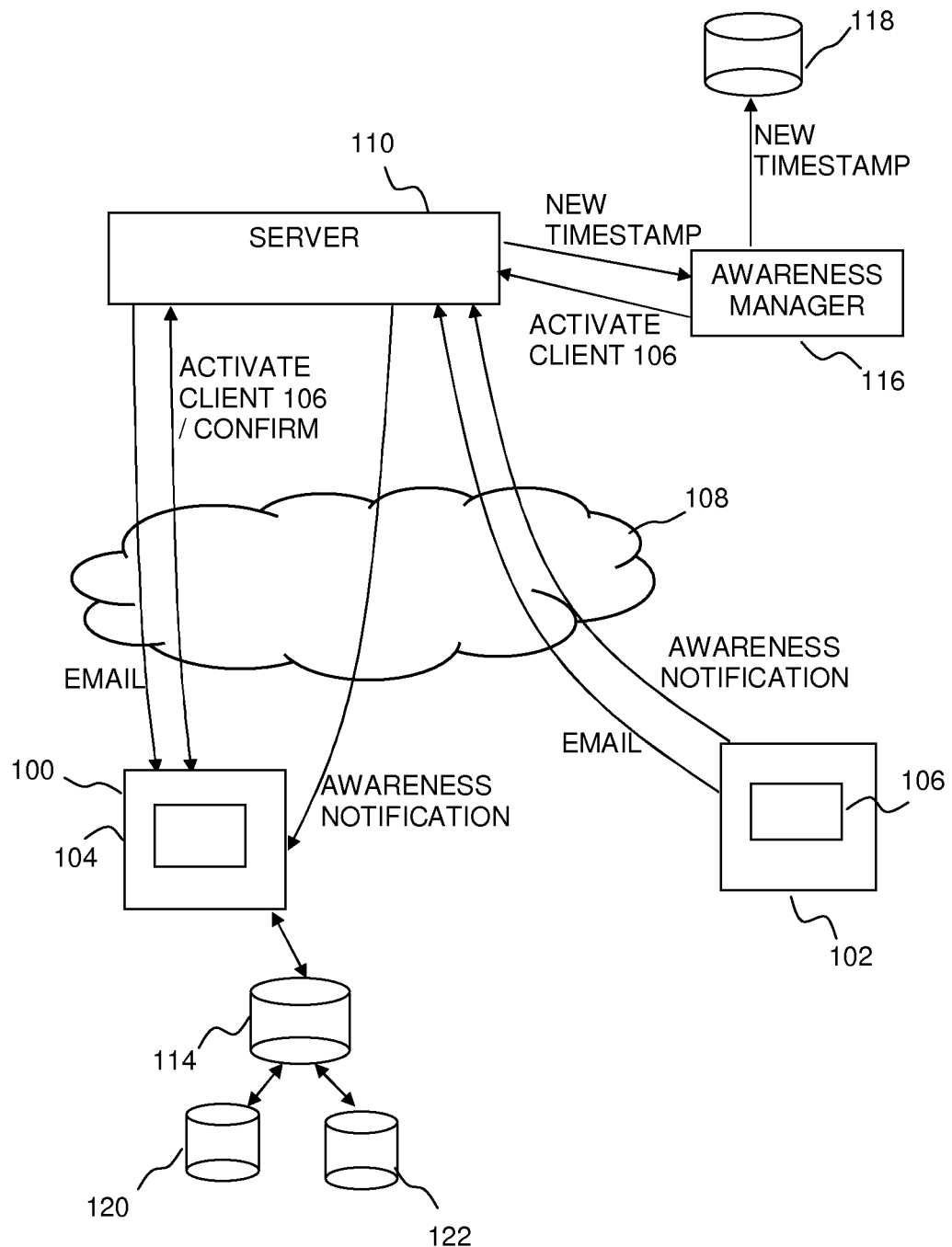
FIG. 1E is a simplified conceptual illustration of an awareness notification management system constructed and operative in accordance with another embodiment of the present invention.
Figure 2E:
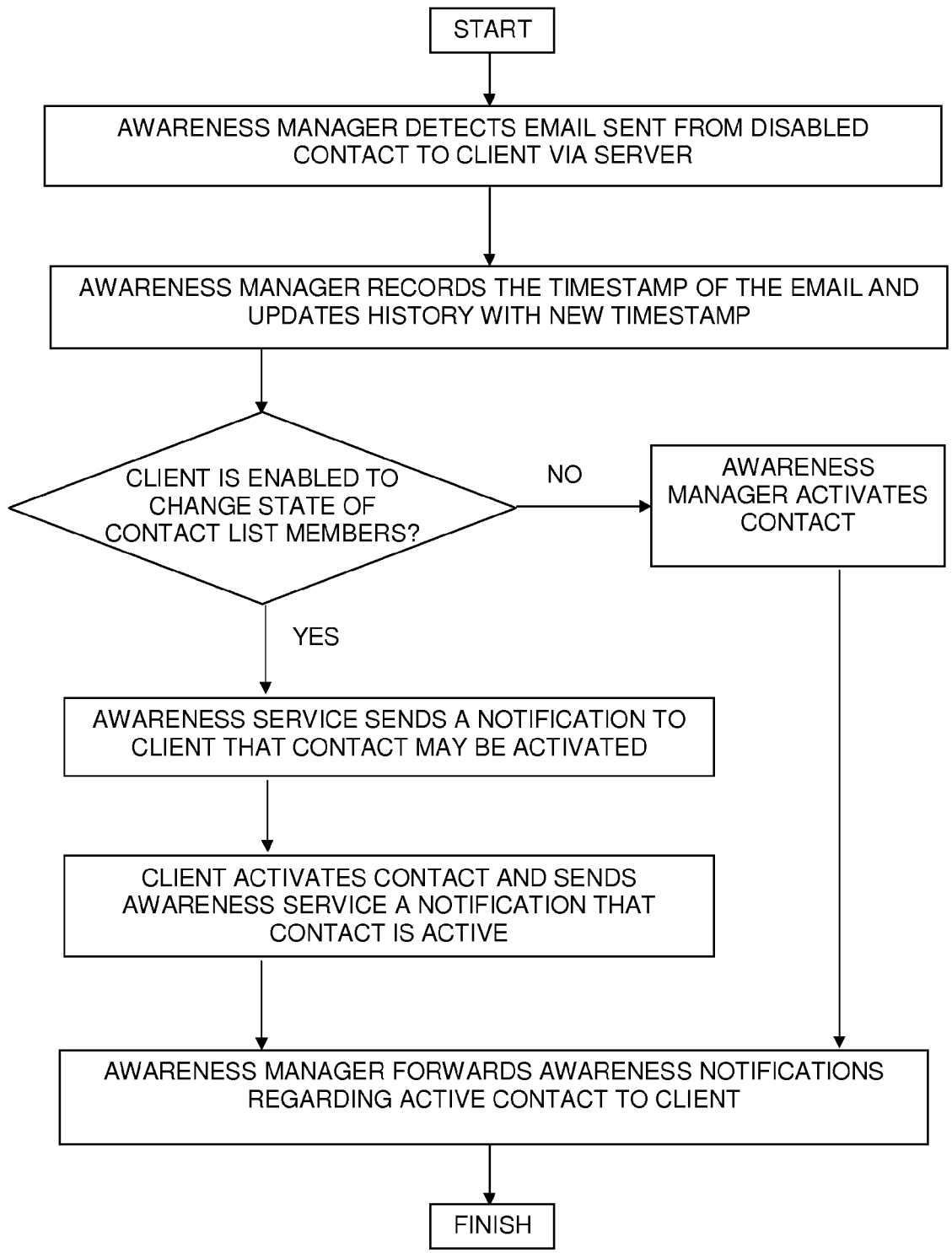
FIG. 2E is a simplified flowchart illustration of an exemplary method of operation of the system of FIG. 1E, operative in accordance with an embodiment of the present invention.

Reference is now made to FIG. 1E which is a simplified conceptual illustration of an awareness notification management system, constructed and operative in accordance with another embodiment of the present invention, and additionally to FIG. 2E, which is a simplified flowchart illustration of an exemplary method of operation of the system of FIG. 1E operative in accordance with another embodiment of the present invention. Once awareness manager 116 has determined the states of the members of contact list 114 and is enabled to monitor the statuses of and forward awareness notifications from the members of active sublist 120 using any of the methods described above, the system of FIG. 1E is preferably used to detect new collaborations between client 104 and members of contact list 114 in order to update history 118, active sublist 120 and archive sublist 122 accordingly. For example, awareness manager 116 may detect information such as email, exchanged via server 110 between client 104 and client 106 who is currently disabled (step 226). Awareness manager 116 records the timestamp of the email and updates history 118 with the new timestamp (step 228). If the system is configured to require awareness manager 116 to execute any status changes and contact list updates then awareness manager 116 activates client 106 in contact list 114 of client 104 using the methods described above (step 230). If the system is configured to enable client 104 to change the notification state of contacts and update contact list 114, then awareness manager 116 notifies client 104 that client 106 may be activated (step 232). Client 104 activates client 106 using the methods described above, and sends awareness manager 116 a notification that client 106 has been activated (step 234). Upon receiving the notification that client 106 has been activated, awareness manager 116 forwards to client 104 awareness notifications sent from client 106 (step 236).

Figure 1F:
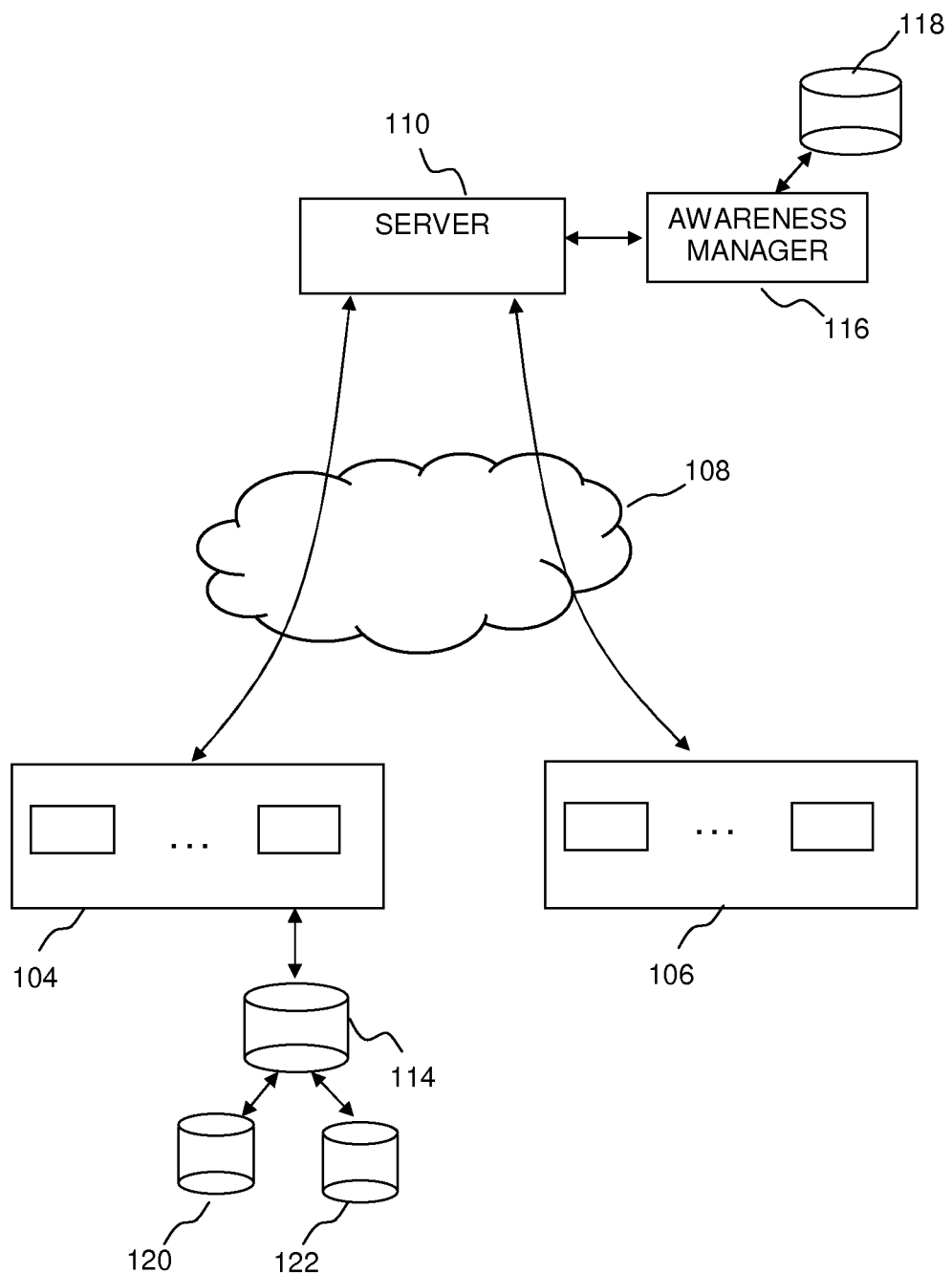
FIG. 1F is a simplified conceptual illustration of an awareness notification management system constructed and operative in accordance with another embodiment of the present invention.

Reference is now made to FIG. 1F which is a simplified conceptual illustration of an awareness notification management system, constructed and operative in accordance with another embodiment of the present invention. The system of FIG. 1F is substantially similar to the systems described above with the noted exception that clients 104 and 106 may include more than one device, such as a computer, cellular phone, or laptop. For example, using the systems and methods described above, all the devices included in client 104 may communicate with and receive awareness notifications from awareness manager 116, and all devices included in client 106 may communicate with and send awareness notifications to awareness manager 116.

It will be appreciated that by managing and organizing contact lists into more than one sublist associated with a defined state, and filtering awareness notifications accordingly, presence awareness may be supported with reduced network load, while not affecting the utility of collaboration software.

While the methods and apparatus herein may or may not have been described with reference to specific computer hardware or software, it is appreciated that the methods and apparatus described herein may be readily implemented in computer hardware or software using conventional techniques. Any of the elements shown or described herein are preferably executed by or otherwise accessible to a computer, such as by implementing any of the elements in computer hardware or in computer software embodied in a computer-readable medium.

While the present invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. An awareness notification management system comprising:
   a processor and a memory operatively coupled to the processor;
   a contact list manager configured to manage a contact list for each of a plurality of awareness service subscribers, said contact list including an active sublist having a plurality of active contacts and an archive sublist having a plurality of disabled contacts; and
   an awareness manager configured to monitor a status of any member of said contact list;
   wherein said awareness manager is configured to access a history including at least one timestamp of a last communication exchange between said awareness service subscriber and any of said members of said contact list, and query said history for any of said timestamps and classify any of said contacts as a disabled contact on said archive sublist if said timestamp for said contact is older than a predefined age, and
   wherein said awareness manager is configured to forward to said awareness service subscriber awareness notifications regarding the status of said active contacts, and
   wherein said awareness manager is configured to withhold from said awareness service subscriber awareness notifications regarding the status of said disabled contacts in response to said awareness manager classifying said contacts as said disabled contacts.

2. A system according to claim 1 wherein said contact manager is configured to notify said awareness service subscriber which of said contacts are disabled contacts.

3. A system according to claim 1 wherein said awareness manager is configured to maintain said history.

4. A system according to claim 1 wherein said awareness manager is configured to classify any of said contacts as an active contact on said active sublist if said timestamp for said contact is younger than a predefined age.

5. A system according to claim 1 wherein said awareness manager is configured to receive a request from said awareness service subscriber to reclassify any of said disabled contacts as an active contact on said active sublist.

6. A system according to claim 1 wherein said awareness manager is configured to receive a request from said awareness service subscriber to reclassify any of said active contacts as a disabled contact on said archive sublist.

7. A system according to claim 1 wherein said awareness manager is configured to request a confirmation from said awareness service subscriber prior to classifying any of said active contacts as a disabled contact on said archive sublist, and classify said active contacts as a disabled contact responsive to receiving a positive response to said confirmation.

8. A system according to claim 1 wherein said awareness manager is configured to detect new collaborations between said awareness service subscriber and any of said members of said contact list and update any of said history, said active sublist, and said archive sublist responsive to said detection.

9. The system according to claim 1, wherein contacts are dragged and dropped between the active sublist and the archive sublist.

10. The system according to claim 1, wherein the system is for the exchange of e-mail.

11. An awareness notification management method comprising:
    managing, by an awareness manager, a contact list for each of a plurality of awareness service subscribers, said contact list including an active sublist having a plurality of active contacts and an archive sublist having a plurality of disabled contacts;
    monitoring, by said awareness manager, a status of any member of said contact list;
    querying, by said awareness manager, a history for at least one timestamp of a last communication exchange between said awareness service subscriber and any of said members of said contact list;
    classifying, by said awareness manager, any of said contacts as a disabled contact on said archive sublist if said timestamp for said contact is older than a predefined age;
    forwarding, by said awareness manager, to said awareness service subscriber awareness notifications regarding the status of said active contacts; and
    withholding, by said awareness manager, from said awareness service subscriber awareness notifications regarding the status of said disabled contacts in response to said awareness manager classifying said contacts as said disabled contacts,
    wherein said classifying is performed by a processor.

12. A method according to claim 11 and further comprising notifying said awareness service subscriber which of said contacts are disabled contacts.

13. A method according to claim 11 and further comprising maintaining said history.

14. A method according to claim 11 and further comprising classifying any of said contacts as an active contact on said active sublist if said timestamp for said contact is younger than a predefined age.

15. A method according to claim 11 and further comprising receiving a request from said awareness service subscriber to reclassify any of said disabled contacts as an active contact on said active sublist.

16. A method according to claim 11 and further comprising receiving a request from said awareness service subscriber to reclassify any of said active contacts as a disabled contact on said archive sublist.

17. A method according to claim 11 and further comprising requesting a confirmation from said awareness service subscriber prior to classifying any of said active contacts as a disabled contact on said archive sublist, and classifying said active contacts as a disabled contact responsive to receiving a positive response to said confirmation.

18. A method according to claim 11 and further comprising detecting new collaborations between said awareness service subscriber and any of said members of said contact list and update any of said history, said active sublist, and said archive sublist responsive to said detection.

19. A method for representing contacts and their statuses, the method comprising:
    receiving, by a user, an active sublist having a plurality of active contacts and an archive sublist having a plurality of disabled contacts;
    displaying, by the user, said sublists wherein the members each of said sublists are visually differentiated;
    monitoring, by a server, a status of at least one of the plurality of active contacts and at least one of the plurality of disabled contacts;
    determining, by the server, a change in a status of at least one of the plurality of disabled contacts; and
    withholding, by the server, a notification regarding the change in the status to be sent to the user,
    wherein a contact list including the active sublist and the archive sublist is managed for each of a plurality awareness service subscribers.

20. A non-transitory computer-readable medium embodying a computer program for enabling a computer to execute an awareness notification management method, the computer program comprising:
    a first code segment operative to manage a contact list for each of a plurality of awareness service subscribers, said contact list including an active sublist having a plurality of active contacts and an archive sublist having a plurality of disabled contacts;
    a second code segment operative to monitor a status of any member of said contact list;
    a third code segment operative to query a history for at least one timestamp of a last communication exchange between said awareness service subscriber and any of said members of said contact list;
    a fourth code segment operative to classify any of said contacts as a disabled contact on said archive sublist if said timestamp for said contact is older than a predefined age; and
    a fifth code segment operative to forward to said awareness service subscriber awareness notifications regarding the status of said active contacts,
    the fifth code segment further operative to withhold from said awareness service subscriber awareness notifications regarding the status of said disabled contacts, the notifications being withheld in response to said fourth code segment classifying said contacts as said disabled contacts.

21. A computer program according to claim 20 and further comprising a sixth code segment operative to notify said awareness service subscriber which of said contacts are disabled contacts.

22. A computer program according to claim 20 and further comprising a sixth code segment operative to maintain said history.

23. A computer program according to claim 20 and further comprising a sixth code segment operative to classify any of said contacts as an active contact on said active sublist if said timestamp for said contact is younger than a predefined age.

24. A computer program according to claim 20 and further comprising a sixth code segment operative to receive a request from said awareness service subscriber to reclassify any of said disabled contacts as an active contact on said active sublist.

25. A computer program according to claim 20 and further comprising a sixth code segment operative to receive a request from said awareness service subscriber to reclassify any of said active contacts as a disabled contact on said archive sublist.

26. A computer program according to claim 20 and further comprising a sixth code segment operative to request a confirmation from said awareness service subscriber prior to classifying any of said active contacts as a disabled contact on said archive sublist, and classify said active contacts as a disabled contact responsive to receiving a positive response to said confirmation.

27. A computer program according to claim 20 and further comprising a sixth code segment operative to detect new collaborations between said awareness service subscriber and any of said members of said contact list and update any of said history, said active sublist, and said archive sublist responsive to said detection.

\* \* \* \* \*